INVENTORS
DOLPH G. FRANTZ
WILLIAM JOSEPH
BY Beale and Jones
ATTORNEYS

INVENTORS
DOLPH G. FRANTZ
WILLIAM JOSEPH

BY Beale and Jones
ATTORNEYS 3,420,599
ADJUSTABLE BINOCULAR WORN AS GLASSES
Dolph G. Frantz, 3212 Dorchester Drive, and William Joseph, 3719 Berkley Drive, both of Montgomery, Ala. 36111
Filed Oct. 19, 1965, Ser. No. 497,633
U.S. Cl. 350—146
Int. Cl. G02b 25/00; G02b 7/02; G02c 3/00
1 Claim

ABSTRACT OF THE DISCLOSURE

There is a front lens system or frame carrying lens for each eye of the user and this is guidedly mounted on a rear lens system for movement toward or away from that system. The rear lens system carries lens for each eye of the user. Means for moving the front lens system toward or away from the rear lens system is provided. A screw member oppositely threaded on each half is mounted on and parallel to the rear lens system. Threaded sleeves are received on each threaded half and these are pivotally connected to the rear ends of two spacing levers that extend forward to a common pivot at the center of the front lens system. A cable is connected to one end of the screw member to rotate the same thereby moving the front lens system toward or away from the rear lens system for binocular vision.

---

This invention relates to improvements in an optical instrument of the binocular type having the optical lenses mounted in eyeglass lens systems so designed that the instrument may be supported on the head of the user, leaving the hands free.

The invention consists mainly in a construction of the focal adjusting mechanism with a novel extension to permit continuous or frequent focal adjustment of the optical parts without the tiring effort of having to hold the arms in an elevated position for extended periods of time.

With the foregoing and other objects and advantages in view which will become apparent in the details of construction and operation as the description proceeds, the invention consists of certain novel features, arrangements and combinations of parts, hereinafter more fully described and pointed out in the claim, it being understood that changes may be made in the form, size, construction and arrangement of parts without departing from the spirit or sacrificing any of the advantages of the invention.

Figure 1:
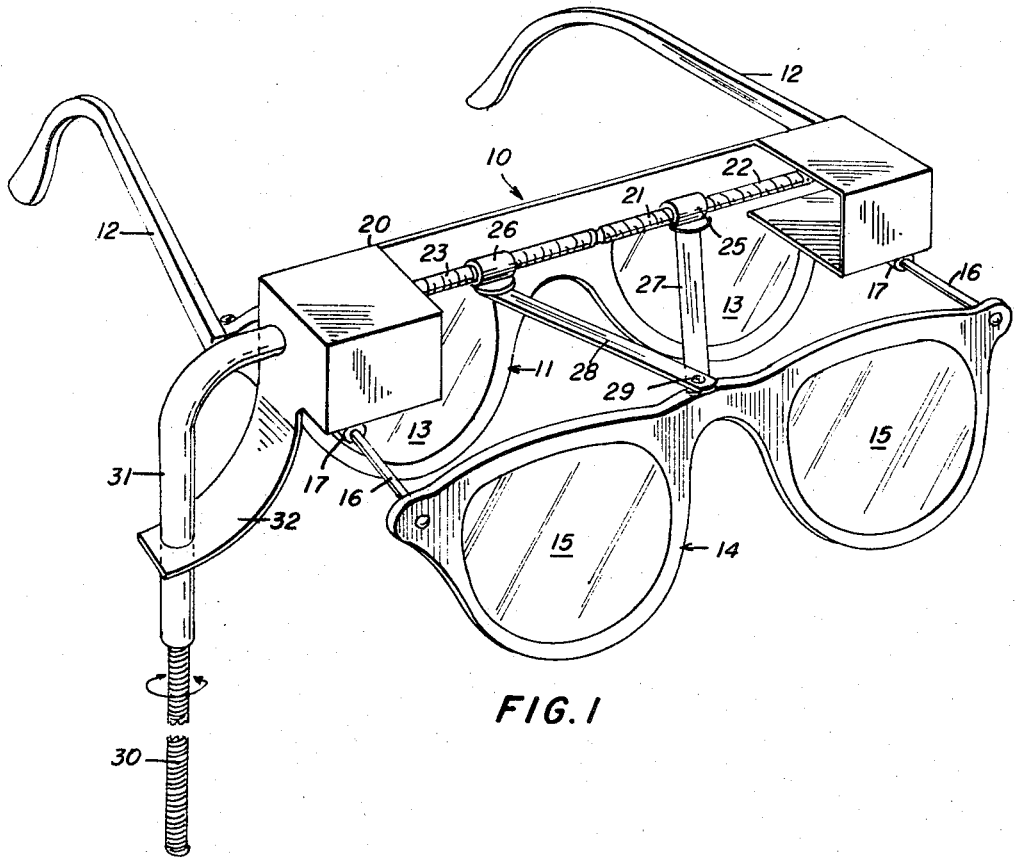
FIG. 1 is a perspective view of one embodiment of the eyeglass type binocular optical instrument.
Figure 2:
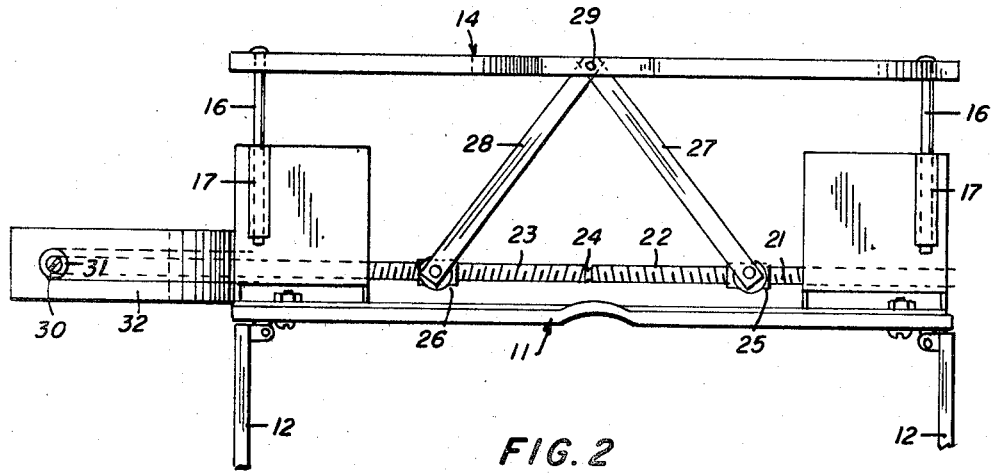
FIG. 2 is an inverted plan view of the instrument in FIG. 1 observed from the under side of the instrument.
Figure 3:
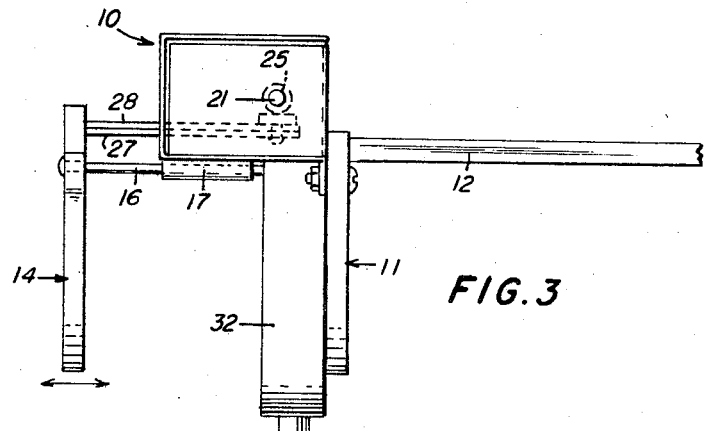
FIG. 3 is a side elevation view of the instrument in FIG. 1.

Referring to the drawings in detail, wherein like reference characters designate like or corresponding parts throughout the several views, the numeral 10 designates a binocular instrument of the eyeglass type in general with specific parts and functions as more fully explained. A conventionally appearing rear eyeglass lens system or frame 11, having bows 12 is designed and intended to be worn in the usual manner and is fitted with appropriate binocular eyepiece lenses 13. A front eyeglass lens system or frame 14, similar in design for appearance sake is fitted with binocular objective lenses 15 and held in optical alignment with rear frame 11 by the guide rods 16, securely attached to the front frame 14, and slidingly held in close fitting guide sleeves 17.

A support structure 20 is secured across the upper part of frame 11 to support guide sleeves 17 and focal adjusting screw 21. Adjusting screw 21, rotatively held in support structure 20, is provided with right and left hand threads 22 and 23 on either side of the mid point 24. Internally threaded sleeves 25 and 26, threaded appropriately to engage the right and left hand threads of screw 21, are pivotally attached to the adjusting levers 27 and 28. Opposite ends of levers 27 and 28 are pivotally attached to frame 14 by the pin 29 at a common point. When screw 21 is selectively rotated the adjusting sleeves 25 and 26 approach each other for one direction of rotation and separate for the other, thus moving frame 14 away or toward frame 11 for focal adjustment.

Selective rotation of screw 21 from an extended point is obtained by attaching a flexible cable 30 to one end of screw 21 and leading it outwardly and downwardly through a tubular casing 31. A projection 32 of support structure 20 holds casing 31 in a fixed position, bending and holding flexible cable 30 in a direction to make it easily turned at will without having to raise the hands to eye level on each occasion that an object at a different distance is observed.

Figure 4:
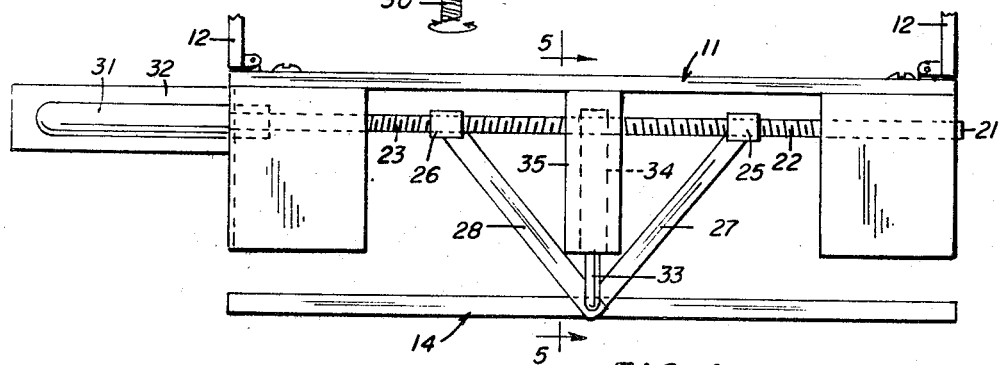
FIG. 4 is a plan view of a second embodiment of the binocular instrument.
Figure 5:
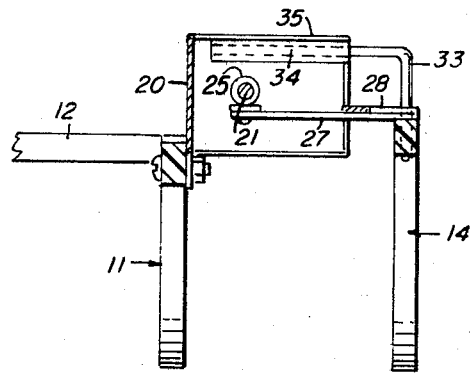
FIG. 5 is a sectional elevation view of the instrument in FIG. 4 along line 5—5.

A second embodiment is shown in FIGS. 4 and 5 and substitutes a modified guide means to maintain the frames 11 and 14 in optical alignment. A single guide rod 33, formed with a right angle bend, is secured to frame 14 in place of the previously described pivot pin 29, serving as the pivot pin as well as a guide rod. Guide rod 33 slides in close fitting sleeve 34 which is attached to a second projection 35 on support structure 20.

The parts may be made of suitable material such as aluminum or other light metal for the threaded and guide members. Other parts may also be made of light metal, nylon or other suitable plastic. Battery operated motor means could be suitably attached to operate the adjusting screw 21.

There has herein been provided a light weight wearable binoculars that leave the hand free except for one hand to make the necessary adjustment through the control cable.

What is claimed is:

1. In an optical instrument of the binocular type, comprising, front and rear eyeglass lens systems containing objective and eyepiece lenses respectively; guide means connecting said lens systems to maintain optical alignment thereof comprising guide sleeves attached to one of said lens system receiving guide rods attached to the other of said lens systems; a threaded screw rotatably carried on and parallel to said rear eyeglass lens system and having each half threaded in opposite directions; a movable sleeve threadedly received on each threaded half of the screw; two single spacing levers having one end of each connected to said front lens system on a common central pivot and the other ends directly pivotally connected to said respective movable sleeves to move therewith; and a flexible cable means extending through a fixed sleeve mounting means attached to said rear lens system, said cable means connected to one end of said threaded screw to rotate the same whereby selective rotation of said screw causes said threaded sleeves either to move towards each other thereby moving said spacing levers towards each other to increase the distance between the front and rear lens systems or to move said threaded sleeves away from each other thereby moving said spacing levers away from each other to decrease the distance between said lens systems.

(References on following page)

References Cited

UNITED STATES PATENTS

| | | | |
|---|---|---|---|
| 565,596 | 8/1896 | Bloch | 350—74 |
| 624,369 | 5/1899 | McLernon | 350—146 |
| 1,179,787 | 4/1916 | Walter | 350—70 |
| 1,795,425 | 3/1931 | Cover | 350—72 X |
| 1,986,688 | 1/1935 | Thiele | 2—14.1 |
| 2,642,776 | 6/1953 | Boeder | 350—14.6 |

FOREIGN PATENTS 1,316,033  1/1961  France.

DAVID SCHONBERG, *Primary Examiner.*

P. R. GILLIAM, *Assistant Examiner.*

U.S. Cl. X.R.

350—72, 77; 351—41